(12) United States Patent
Babaee et al.

(10) Patent No.: US 11,239,929 B1
(45) Date of Patent: Feb. 1, 2022

(54) APPROXIMATION OF RECURSIVE LEAST SQUARES EQUALIZATION

(71) Applicants: Ramin Babaee, Ottawa (CA); Shahab Oveis Gharan, Ottawa (CA); Martin Bouchard, Cantley (CA); Kim B. Roberts, Ottawa (CA)

(72) Inventors: Ramin Babaee, Ottawa (CA); Shahab Oveis Gharan, Ottawa (CA); Martin Bouchard, Cantley (CA); Kim B. Roberts, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/203,332

(22) Filed: Mar. 16, 2021

(51) Int. Cl.
*H04B 3/46* (2015.01)
*H04B 17/318* (2015.01)

(52) U.S. Cl.
CPC .................................. *H04B 17/318* (2015.01)

(58) Field of Classification Search
CPC .................................................... H04B 17/318
USPC ........................................................ 375/224
See application file for complete search history.

(56) References Cited

U.S. PATENT DOCUMENTS

| | | | |
|---|---|---|---|
| 8,005,368 B2 | 8/2011 | Roberts et al. | |
| 8,385,747 B2 | 2/2013 | Roberts et al. | |
| 9,094,122 B2 | 7/2015 | Roberts et al. | |
| 9,143,238 B2* | 9/2015 | Roberts | H04B 10/532 |
| 9,590,731 B2 | 3/2017 | Roberts et al. | |
| 10,819,432 B1* | 10/2020 | Oveis Gharan | H04B 10/07951 |
| 10,938,483 B1 | 3/2021 | Babaee et al. | |
| 11,038,599 B1* | 6/2021 | Oveis Gharan | H04B 10/616 |

(Continued)

OTHER PUBLICATIONS

G. Long, F. Ling, and J. G. Proakis, "The LMS algorithm with delayed coefficient adaptation", IEEE Transactions on Acoustics, Speech, and Signal Processing, vol. 37, No. 9, pp. 1397-1405, 1989.

(Continued)

*Primary Examiner* — Helene E Tayong
(74) *Attorney, Agent, or Firm* — Integral Intellectual Property Inc.; Amy Scouten; Miriam Paton

(57) ABSTRACT

A receiver is configured to detect, at a communication interface, a received signal that suffers from degradations incurred over a communication channel. The receiver applies an adaptive filter to a series of received blocks of a digital representation of the received signal, thereby generating respective filtered blocks, where each received block represents 2N frequency bins, and where N is a positive integer. The receiver calculates coefficients for use by the adaptive filter on a $j^{th}$ received block as a function of (i) error estimates associated with an $(j-D-1)^{th}$ filtered block, where D is a positive integer representing a number of blocks, and where j is a positive integer greater than (D-1); and (ii) an inverse of an approximate covariance matrix associated with the $(j-D-1)^{th}$ received block, where the approximate covariance matrix is a diagonal matrix of size L×L, and where L is a positive integer lower than 2N.

20 Claims, 6 Drawing Sheets

(56) References Cited

U.S. PATENT DOCUMENTS

| | | | | |
|---|---|---|---|---|
| 2005/0201757 A1* | 9/2005 | Bohn | ................ | H04B 10/2507 398/149 |
| 2012/0128376 A1* | 5/2012 | Sun | ................... | H04B 10/6161 398/208 |
| 2012/0189318 A1* | 7/2012 | Mo | ..................... | H04B 10/697 398/152 |
| 2012/0189319 A1* | 7/2012 | Mo | ................... | H04B 10/6165 398/152 |
| 2012/0219302 A1* | 8/2012 | Sun | ................... | H04B 10/6165 398/208 |
| 2016/0142179 A1* | 5/2016 | Fludger | ................. | H04J 14/06 398/65 |
| 2020/0177307 A1* | 6/2020 | Pan | ..................... | H04L 1/0058 |

OTHER PUBLICATIONS

H. Buchner, J. Benesty, and W. Kellermann, "Generalized multi-channel frequency-domain adaptive filtering: efficient realization and application to hands-free speech communication," Signal Processing, vol. 85, No. 3, pp. 549-570, 2005.

M. Schneider and W. Kellermann, "The generalized frequency-domain adaptive filtering algorithm as an approximation of the block recursive least-squares algorithm", EURASIP Journal on Advances in Signal Processing, vol. 2016, 12 2016.

T. Ernst and A. Kaelin, "Analysis of the LMS algorithm with delayedcoefficient update", Proceedings of ISCAS'95-International Symposiumon Circuits and Systems, vol. 2, pp. 1247-1250 vol. 2, 1995.

* cited by examiner

US 11,239,929 B1

APPROXIMATION OF RECURSIVE LEAST SQUARES EQUALIZATION

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical signal, degradation or distortion may be caused by polarization mode dispersion (PMD), polarization dependent loss or gain (PDL or PDG), state of polarization (SOP) rotation, amplified spontaneous emission (ASE), wavelength-dependent dispersion or chromatic dispersion (CD), and other effects. The degree of signal degradation may be characterized by a signal-to-noise ratio (SNR), or alternatively by a noise-to-signal ratio (NSR).

The degradation and/or distortion observed in the received signal depends on the condition of the communication channel over which the signal is received. The condition of the communication channel may be characterized by the channel response, which may vary over time. By tracking time-varying changes in the channel response, it may be possible to compensate for those changes in the received signal, a process generally referred to as channel equalization.

SUMMARY

According to a broad aspect, a receiver device comprises a communication interface configured to detect a received signal comprising a degraded version of a transmitted signal, the received signal suffering from degradations incurred over a communication channel. The receiver device is configured to apply an adaptive filter to a series of received blocks of a digital representation of the received signal, thereby generating respective filtered blocks, wherein each received block represents 2N frequency bins, and wherein N is a positive integer. The receiver device is further configured to calculate coefficients for use by the adaptive filter on a $j^{th}$ received block using (i) error estimates associated with a $(j-D-1)^{th}$ filtered block, wherein D is a positive integer representing a number of blocks, and wherein j is a positive integer greater than (D−1); and (ii) an inverse of an approximate covariance matrix associated with the $(j-D-1)^{th}$ received block, wherein the approximate covariance matrix is a diagonal matrix of size L×L, and wherein L is a positive integer lower than 2N.

According to some examples, the receiver device is configured to calculate the coefficients for use by the adaptive filter on the $j^{th}$ received block using (iii) delay compensation terms dependent on a difference between coefficients used by the adaptive filter on a $(j-D-1)^{th}$ received block and coefficients used by the adaptive filter on a $(j-1)^{th}$ received block.

According to some examples, the approximate covariance matrix is expressed in the frequency domain and each one of L diagonal terms of the approximate covariance matrix corresponds to a different frequency.

According to some examples, the approximate covariance matrix is one of a plurality of sub-matrices comprised in a composite matrix, and the received device is further configured to calculate the coefficients using an inverse of each sub-matrix in the composite matrix.

According to some examples, the composite matrix consists of four diagonal L×L sub-matrices, each sub-matrix approximating a covariance matrix associated with a different polarization of the received signal.

According to some examples, the receiver device is further configured to calculate the approximate covariance matrix for the $(j-D-1)^{th}$ received block as a recursive function of a preceding approximate covariance matrix associated with a preceding received block of the series.

According to some examples, each received block comprises a respective digital representation of a plurality of samples of the received signal detected at the communication interface over a period of time.

According to some examples, the received signal is representative of symbols and the receiver device is configured to decode estimates of the symbols represented by the $(j-D-1)^{th}$ filtered block, and to calculate the error estimates associated with the $(j-D-1)^{th}$ filtered block using the decoded estimates of the symbols.

According to some examples, the symbols include one or more predetermined symbols.

According to some examples, the communication channel comprises an optical communication channel.

DETAILED DESCRIPTION

Figure 1:
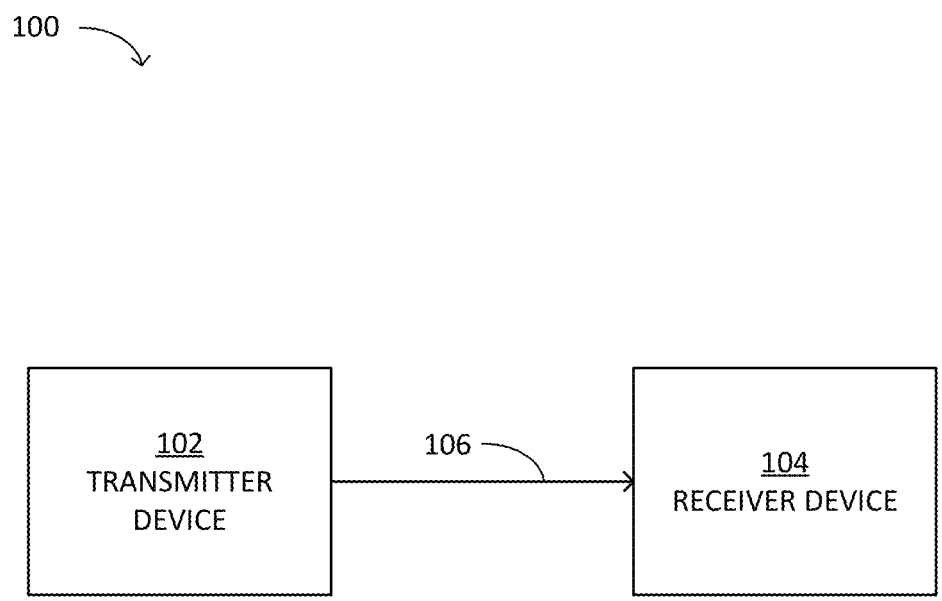
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102, where the degradation is caused by various impairments in the communication channel 106. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over the communication channel 106 from the transmitter device 102, where the communication signal conveys symbols that are representative of digital information. At the receiver device 104, the decoded symbols that are recovered may comprise noisy versions of the symbols that were originally transmitted by the transmitter device 102.

Figure 2:
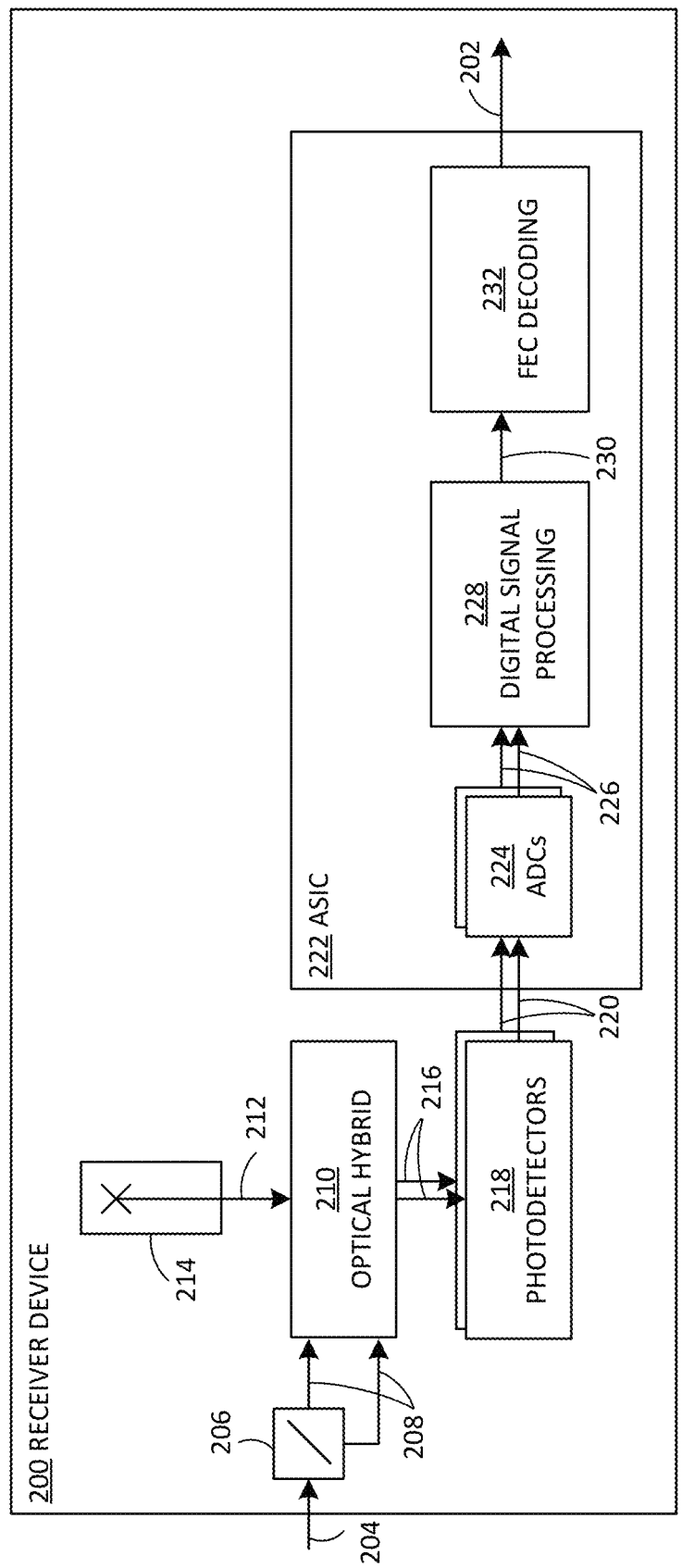
FIG. 2 illustrates an example receiver device in accordance with some examples of the technology disclosed herein.

FIG. 2 illustrates an example receiver device 200, in accordance with some examples of the technology disclosed herein. The receiver device 200 is an example of the receiver device 104. The receiver device 200 may comprise additional components that are not described in this document.

The receiver device 200 is configured to receive an optical signal 204, which may comprise a degraded version of an optical signal generated by a transmitter device, such as the transmitter device 102. The optical signal generated by the transmitter device may be representative of information bits (also referred to as client bits) which are to be communicated to the receiver device 200. The optical signal generated by the transmitter device may be representative of a stream of symbols.

According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques such as polarization-division multiplexing (PDM), single polarization modulation, modulation of an unpolarized carrier, mode-division multiplexing, spatial-division multiplexing, Stokes-space modulation, polarization balanced modulation, and the like.

The receiver device 200 is configured to recover corrected client bits 202 from the received optical signal 204. The receiver device 200 may comprise a polarizing beam splitter 206 configured to split the received optical signal 204 into polarized components 208. According to one example, the polarized components 208 may comprise orthogonally polarized components corresponding to an X polarization and a Y polarization. An optical hybrid 210 is configured to process the components 208 with respect to an optical signal 212 produced by a laser 214, thereby resulting in optical signals 216. Photodetectors 218 are configured to convert the optical signals 216 output by the optical hybrid 210 to analog signals 220. According to one example, the analog signals 220 may comprise four signals corresponding, respectively, to the dimensions XI, XQ, YI, YQ, where XI and XQ denote the in-phase and quadrature components of the X polarization, and YI and YQ denote the in-phase and quadrature components of the Y polarization. Together, elements such as the beam splitter 206, the laser 214, the optical hybrid 210 and the photodetectors 218 may form a communication interface configured to receive optical signals from other devices in a communication network, such as the network 100.

The receiver device 200 may comprise an application specific integrated circuit (ASIC) 222. The ASIC 222 may comprise analog-to-digital converters (ADCs) 224 which are configured to sample the analog signals 220, and to generate respective digital signals 226. Although illustrated as comprised in the ASIC 222, in an alternate implementation the ADCs 224 or portions thereof may be separate from the ASIC 222. The ADCs 224 sample the analog signals 220 periodically at a sample rate that is based on a signal received from a voltage-controlled oscillator (VCO) at the receiver device 200 (not shown).

The ASIC 222 is configured to apply digital signal processing 228 to the digital signals 226, as will be described in more detail with respect to FIG. 3. The digital signal processing 228 may comprise equalization processing designed to compensate for a variety of channel impairments, such as CD, SOP rotation, PMD including group delay (GD) and differential group delay (DGD), PDL or PDG, and other effects. The digital signal processing 228 may further comprise carrier recovery processing, which includes calculating an estimate of carrier frequency offset (i.e., the difference between the frequency of the transmitter laser and the frequency of the receiver laser 214). According to some examples, the digital signal processing 228 may further comprise operations such as multiple-output (MIMO) filtering, clock recovery, and FDM subcarrier demultiplexing. The digital signal processing 228 further comprises symbol-to-bit demapping (or decoding) using a decision circuit, such that signals 230 output by the digital signal processing 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some examples, the equalization processing implemented as part of the digital signal processing 228 may comprise one or more equalizers, where each equalizer is configured to compensate for impairments in the channel response. In general, an equalizer applies a filter to an input signal to generate an output signal that is less degraded than the input signal. The filter is characterized by compensation coefficients which may be incrementally updated from time to time, always with the goal of reducing the degradation observed in the output signal.

According to some examples, the equalization processing may comprise an equalizer filter which is designed to apply a first-order dispersive function to at least partially compensate for slowly changing channel impairments, such as CD. For example, compensation coefficients may be calculated through firmware using the estimated CD during start-up of the receiver device (also referred to the acquisition stage), and those coefficients may be applied to received signals (either by convolution in the time domain, or by multiplication in the frequency domain), thereby resulting in processed signals which are, at least partially, compensated for CD. This equalizer filter may be referred to as "static" because the updating of its compensation coefficients is relatively infrequent. For example, the coefficients may be periodically updated (e.g., once every second) based on information obtained downstream during the digital signal processing. The slow rate of change of the compensation coefficients means that the static equalizer filter may only be capable of tracking and compensating for relatively slow changes in the channel response, and not fast changes. For example, the static equalizer filter may be able to compensate for changes in CD, which are typically at a rate on the order of <1 Hz, but the static equalizer filter may be unable to compensate for changes in SOP rotation, which typically happen much more quickly.

According to some examples, the equalization processing may comprise an additional equalizer filter which uses feedback to compensate for relatively fast changes in the channel response, such as SOP changes, PMD changes, PDL changes, small amounts of CD, and analog characteristics of the transmitter and receiver, which change at a rate on the order of kHz. For example, a standard feedback equalizer may compensate for impairments varying at a rate of approximately 100 kHz.

According to some examples, feedback equalization may rely on a Least Mean Squares (LMS) feedback loop or adaptive Wiener filtering using a constant modulus algorithm (CMA) or an affine projection algorithm (APA) or a recursive least squares (RLS) algorithm. The technology proposed in this document will be described in the context of frequency-domain RLS equalization. However, the proposed technology may also be implemented using blocks in the time domain.

Figure 3:
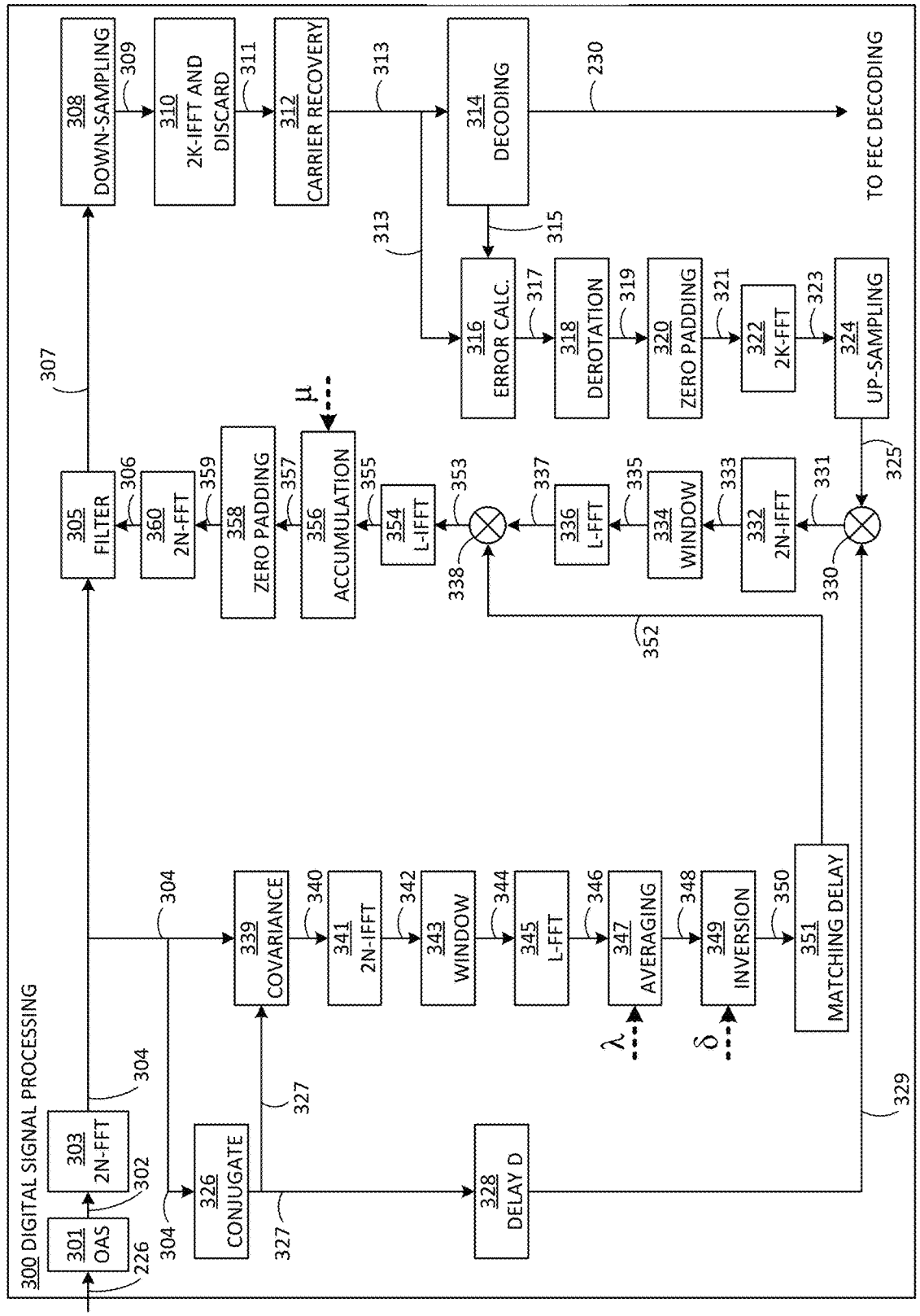
FIG. 3 illustrates digital signal processing for an approximation of recursive least squares (RLS) equalization in accordance with a first example of the technology disclosed herein.

FIG. 3 illustrates digital signal processing 300 for RLS equalization by approximation. The digital signal processing 300 is an example of the digital signal processing 228 shown in FIG. 2.

For ease of explanation, equalization processing will be described for a single polarization (X) while ignoring cross-polarization effects. However, it should be understood that similar processing may be used for additional dimensions (or polarizations) of a multidimensional signal. The technology described in this document may be applied to some or all of these dimensions.

The digital signals 226 corresponding to the X polarization may be denoted by a time-varying vector x. An overlap and save (OAS) operation 301 may be applied to the digital signals 226, and the resulting output time-domain signals 302 may then undergo a fast Fourier transform (FFT) operation 303 to generate discrete frequency-domain signals 304. A FFT of length 2N (also referred to as a FFT matrix of size 2N×2N) is herein denoted by $F_{2N \times 2N}$ or 2N-FFT, wherein N denotes a positive integer. The corresponding inverse FFT (IFFT) of length 2N (also referred to as an IFFT matrix of size 2N×2N) is herein denoted by $F_{2N \times 2N}^{-1}$ or 2N-IFFT. The FFT (and IFFT) operations described throughout this document may alternatively be performed using discrete Fourier transform (DFT) operations.

For the purposes of the examples described herein, a matrix M comprising R rows and C columns is generally denoted by $M_{R \times C}$, while a vector V comprising T terms is generally denoted by $V_T$. The notation diagvec(M) denotes a vector consisting of the diagonal terms of the matrix M. The notation diagmat(V) denotes a diagonal matrix with diagonal terms consisting of the terms of the vector V. The notation firstcol(M) denotes the first or leftmost column of the matrix M. The notation midcol(M) denotes the middle column of the matrix M. The notation circshift(V, p) denotes a circular shift of the vector V by an integer p. The notation M\ denotes the Hermitian of the matrix M.

According to some examples, a given one of the time-domain signals 302 may be expressed in the form of a circulant matrix denoted by $\tilde{x}_{2N \times 2N}$. Due to the circulant form of $\tilde{x}_{2N \times 2N}$, it follows that $(F_{2N \times 2N} \tilde{x}_{2N \times 2N} F_{2N \times 2N}^{-1})$ is a diagonal matrix, herein denoted by $X_{2N \times 2N}$. By definition, the non-diagonal terms of the diagonal matrix $X_{2N \times 2N}$ are equal to zero. The 2N diagonal terms of $X_{2N \times 2N}$ may be calculated by taking the 2N-FFT of the first column of the circulant matrix $\tilde{x}_{2N \times 2N}$. In other words, diagvec($X_{2N \times 2N}$)= $F_{2N \times 2N}$(firstcol[$\tilde{x}_{2N \times 2N}$]).

The discrete frequency-domain signals 304 are made up of blocks, also referred to as FFT blocks, where each block comprises the 2N diagonal elements of a respective matrix $X_{2N \times 2N}$, each diagonal element comprising a complex value representing the in-phase and quadrature components of the frequency-domain signal at a different frequency bin. The diagonal matrix corresponding to the $j^{th}$ block of the discrete frequency-domain signals 304 is denoted by $X_{2N \times 2N}(j)$.

Referring back to FIG. 3, the digital signal processing 300 involves applying a filter 305 to the discrete frequency-domain signals 304, thereby resulting in respective filtered signals 307. The filter 305 is characterized by compensation coefficients 306 which may be expressed as a complex-valued vector $H_{2N}$. As will be described in greater detail herein, the compensation coefficients 306 may be periodically and incrementally adjusted, such that $H_{2N}$ takes on different values over time. The adjustments may be designed to minimize the errors on the symbols that are currently being decoded at the receiver device 200. The values of the compensation coefficients 306 applied to the $j^{th}$ block of the discrete frequency-domain signals 304 are denoted by $H_{2N}(j)$. The filtered signals 307 may be calculated from the product of the signals 304 and the respective compensation coefficients 306 applied by the filter 305, such that $j^{th}$ block of the filtered signals 307 comprises the 2N diagonal terms of $X_{2N \times 2N}(j)H_{2N}(j)$, that is $\text{diagvec}(X_{2N \times 2N}(j)H_{2N}(j))$.

According to some examples, the filtered signals 307 may undergo a down-sampling operation 308 to generate respective down-sampled signals 309. As a result of the down-sampling operation 308, the $j^{th}$ block of the down-sampled signals 309 comprises 2K elements, where K is a positive integer, and where K<N.

According to some examples, the down-sampled signals 309 may undergo a 2K-IFFT and discard operation 310 to generate respective time-domain signals 311. Where the OAS operation 301 is a 50% OAS, the discard applied at 310 may discard half of the 2K elements of the down-sampled signals 309 following the 2K-IFFT.

According to some examples, the time-domain signals 311 may undergo a carrier recovery operation 312 to generate respective signals 313 which are compensated for laser frequency offset and linewidth. A decision circuit may then apply a decoding operation 314 to the signals 313 to recover symbol estimates (represented by signals 315) and corresponding bit estimates (represented by the signals 230). According to some examples, the decoding operation 314 may comprise soft decoding. The signals 230 may subsequently undergo FEC decoding, such as the FEC decoding 232 described with respect to FIG. 2.

A RLS feedback loop may be designed to minimize error in the symbol estimates by minimizing the cost function C expressed in Equation 1:

$$C = (1-\lambda)\sum_{p=0}^{j} \lambda^{j-p} \hat{e}_K^\dagger(p)\hat{e}_K(p) \qquad [1]$$

where $\hat{e}_K(p)$ is a time-domain vector denoting the error signals for the $p^{th}$ block, and where $\lambda$ is a real number in the range (0 . . . 1) which denotes a forgetting factor. Thus, for the $j^{th}$ block of signals being processed by the filter 305, the compensation coefficients 306 are calculated to minimize the cost function C, which is dependent on the values of the error signals $\hat{e}_K$ at blocks p=j, p=j-1, p=j-2, . . . , p=0. The degree to which the cost function C depends on each block preceding the current $j^{th}$ block (i.e., the $(j-1)^{th}$ block, the $(j-2)^{th}$ block, etc.) depends on the value of the forgetting factor $\lambda$.

Referring to FIG. 3, the error signals $\hat{e}_K(j)$ for the $j^{th}$ block may be calculated using an error calculation operation 316. The operation may generate error signals 317 from the difference between the signals 313 and the signals 315. This calculation is expressed in Equation 2:

$$\hat{e}_K(j) = \hat{d}_K(j) - \Phi_{K \times K}(j)W_{K \times 2K}^{01}F_{2K \times 2K}^{-1}U_{2N \times 2K}^\dagger X_{2N \times 2N}(j)H_{2N}(j) \qquad [2]$$

where $\hat{d}_K(j)$ is a time-domain vector denoting signals representing the decoded symbol estimates of the $j^{th}$ block (corresponding to the signals 315), where $\Phi_{K \times K}(j)$ denotes a diagonal carrier recovery matrix for the $j^{th}$ block (corresponding to the operation 312), where $W_{K \times 2K}^{01} = [0_{N \times N} I_{N \times N}]$ denotes a discard matrix which discards the first half of 2K input samples and where $F_{2K \times 2K}^{-1}$ denotes a 2K-IFFT matrix (corresponding to the operation 310), where $U_{2N \times 2K}^\dagger$ denotes a down-sampling matrix which converts 2N input samples to 2K output samples (corresponding to the operation 308), where $X_{2N \times 2N}(j)$ denotes the diagonal matrix corresponding to the $j^{th}$ block of the discrete frequency-domain signals, and where the vector $H_{2N}(j)$ denotes the frequency-domain compensation coefficients applied to the $j^{th}$ block.

According to some examples, the digital signals 226 may be representative of a stream of symbols, the stream comprising payload symbols and predetermined training symbols distributed over time. In such cases, the error calculation operation 316 may generate the error signals 317 by comparing the signals 313 to signals representative of the known training symbols.

Given the error signals $\hat{e}_K(j)$ expressed in Equation 2, minimization of the cost function C in Equation 1 may be achieved by configuring the filter 305 to apply compensation coefficients $H_{2N}(j)$ as expressed in Equation 3:

$$H_{2N}(j) = H_{2N}(j-1) + \mu F_{2N \times 2N} W_{2N \times L}^{10}[(W_{2N \times L}^{10})^\dagger F_{2N \times 2N}^{-1} S_{2N \times 2N}(j-1) F_{2N \times 2N} W_{2N \times L}^{10}]^{-1} (W_{2N \times L}^{10})^\dagger F_{2N \times 2N}^{-1} X_{2N \times 2N}^\dagger(j-1) E_{2N}(j-1) \qquad [3]$$

where the vector $H_{2N}(j)$ denotes the frequency-domain compensation coefficients for the $j^{th}$ block, where the vector $H_{2N}(j-1)$ denotes the frequency-domain compensation coefficients for the $(j-1)^{th}$ block, where $\mu$ denotes a real number referred to as the gain factor, where $F_{2N \times 2N}$ denotes the 2N-FFT matrix and $F_{2N \times 2N}^{-1}$ denotes the 2N-IFFT matrix, where $W_{2N \times L}^{10}$ denotes a zero-padding matrix which pads L samples with (2N−L) zeros to form a vector of length 2N (where L is a positive integer lower than 2N), where $$(W_{2N \times L}^{10})^\dagger = \begin{bmatrix} I_{L \times L} \\ 0_{(2N-L) \times L} \end{bmatrix}^\dagger$$

denotes a matrix which windows signals from length 2N to length L, where I denotes an identity matrix, where $X_{2N \times 2N}^\dagger(j-1)$ denotes the Hermitian of the diagonal matrix $X_{2N \times 2N}(j-1)$ corresponding to the $(j-1)^{th}$ block of the discrete frequency-domain signals, where $S_{2N \times 2N}(j-1)$ denotes a covariance matrix for the $(j-1)^{th}$ block (to be discussed further below), and where $E_{2N}(j-1)$ is a frequency-domain vector denoting the error signals for the $(j-1)^{th}$ block.

The frequency-domain error vector $E_{2N}(j)$ for the $j^{th}$ block is a function of the time-domain error vector $\hat{e}_K(j)$ according to the expression in Equation 4:

$$E_{2N}(j) = U_{2N \times 2K} F_{2K \times 2K}(W_{K \times 2K}^{01})^\dagger \Phi_{K \times K}^\dagger(j) \hat{e}_K(j) \qquad [4]$$

where $U_{2N \times 2K}$ denotes an up-sampling matrix which converts 2K input samples to 2N output samples, where $F_{2K \times 2K}$ denotes a 2K-FFT matrix, where $(W_{K \times 2K}^{01})^\dagger$ denotes a zero padding matrix which pads K samples with K zeros, and where $\Phi_{K \times K}^\dagger(j)$ denotes a derotation matrix for the $j^{th}$ block. The generation of the frequency-domain vector $E_{2N}(j)$ from the time-domain vector $\hat{e}_K(j)$ is reflected by a series of operations 318, 320, 322, and 324. These operations effectively reverse the effects of the operations 308, 310, and 312. That is, the signals 317 (corresponding to $\hat{e}_K(j)$) undergo a derotation operation 318 (corresponding to $\Phi_{K \times K}^\dagger(j)$ in Equation 4) to reverse the effects of the carrier recovery operation 312, thereby resulting in respective signals 319. A zero padding operation 320 (corresponding to $(W_{K \times 2K}^{01})^\dagger$ in Equation 4) is applied to the signals 319 to reverse the effects of the discard applied by the operation 310, thereby resulting in respective signals 321. A 2K-FFT operation 322

(corresponding to $F_{2K\times 2K}$ in Equation 4) is applied to the signals 321 to reverse the effects of the 2K-IFFT operation 310, thereby resulting in respective signals 323. Finally, an up-sampling operation 324 (corresponding $U_{2N\times 2K}$ in Equation 4) is applied to the signals 323 to reverse the effects of the down-sampling operation 308, thereby resulting in respective signals 325, which correspond to the error vector $E_{2N}(j)$.

The covariance matrix $S_{2N\times 2N}$ in Equation 3 is a diagonal matrix that is calculated recursively according to the expression below:

$$S_{2N\times 2N}(j)=\lambda S_{2N\times 2N}(j-1)+(1-\lambda)X_{2N\times 2N}^\dagger(j)U_{2N\times 2K}$$
$$F_{2K\times 2K}(W_{K\times 2K}^{01})^\dagger W_{K\times 2K}^{01}F_{2K\times 2K}^{-1}U_{2N\times 2K}^\dagger$$
$$X_{2N\times 2N}(j) \quad [5]$$

where λ denotes the forgetting factor as defined in Equation 1, where $X_{2N\times 2N}(j)$ denotes the diagonal matrix corresponding to the $j^{th}$ block of the discrete frequency-domain signals, where $X_{2N\times 2N}^\dagger(j)$ denotes the Hermitian of $X_{2N\times 2N}(j)$, where $U_{2N\times 2K}$ denotes the up-sampling matrix, where $U_{2N\times 2K}^\dagger$ denotes the down-sampling matrix, where $F_{2K\times 2K}$ denotes the 2K-FFT matrix and $F_{2K\times 2K}^{-1}$ denotes the 2K-IFFT matrix, where $(W_{K\times 2K}^{01})^\dagger$ denotes the zero padding matrix, and where $W_{K\times 2K}^{01}$ denotes the discard matrix.

Referring to Equation 3, it is apparent that the compensation coefficients $H_{2N}(j)$ for the $j^{th}$ block of the discrete frequency-domain signals are dependent, in part, on the expression $[(W_{2N\times L}^{10})^\dagger F_{2N\times 2N}^{-1} S_{2N\times 2N}(j-1) F_{2N\times 2N} W_{2N\times L}^{10}]^{-1}$. This expression is equivalent to inverting a matrix of size L×L. Thus, in order to calculate the compensation coefficients $H_{2N}(j)$ according to the exact RLS algorithm, it would be necessary to perform a matrix inversion of size L×L. In practice, the value of L may be quite large, such that the matrix inversion is very computationally expensive to implement. For example, a 30-tap RLS filter would require inverting a 30×30 matrix, which would be difficult if not impossible to implement in hardware.

According to some examples, the term $F_{2K\times 2K}(W_{K\times 2K}^{01})^\dagger W_{K\times 2K}^{01} F_{2K\times 2K}^{-1}$ in Equation 5 may be simplified to $$\frac{1}{2}I_{2K\times 2K},$$

where I denotes an identity matrix. Furthermore, in the event that the roll-off factor of the pulse shaping (e.g., the product of transmitter filtering and receiver filtering which, in the case of matched filtering, may comprise, for example, the product of two root raised cosine filters) is close to zero, then $U_{2N\times 2K}U_{2N\times 2K}^\dagger$ may also be approximated by an identity matrix of $I_{2N\times 2N}$. Using these approximations, Equation 5 may be simplified as expressed below:

$$S_{2N\times 2N}(j) = \lambda S_{2N\times 2N}(j-1) + \frac{(1-\lambda)}{2}X_{2N\times 2N}^\dagger(j)X_{2N\times 2N}(j) \quad [6]$$

Given the simplified version of $S_{2N\times 2N}(j)$ in Equation 6, the expression $[(W_{2N\times L}^{10})^\dagger F_{2N\times 2N}^{-1} S_{2N\times 2N}(j-1) F_{2N\times 2N} W_{2N\times L}^{10}]^{-1}$ in Equation 3 may be approximated as expressed below:

$$[(W_{2N\times L}^{10})^\dagger F_{2N\times 2N}^{-1} S_{2N\times 2N}(j-1) F_{2N\times 2N} W_{2N\times L}^{10}]^{-1} \approx$$
$$(W_{2N\times L}^{10})^\dagger F_{2N\times 2N}^{-1}[S_{2N\times 2N}(j-1)]^{-1} F_{2N\times 2N} W_{2N\times L}^{10} \quad [7]$$

Because the matrix $S_{2N\times 2N}(j-1)$ is a diagonal matrix, calculating the inverse matrix $[S_{2N\times 2N}(j-1)]^{-1}$ only requires calculating the inverse of each element on the diagonal, that is 2N elements. Thus, using the simplifications in Equations 6 and 7, the compensation coefficients $H_{2N}(j)$ may be calculated by inverting a vector of length 2N, rather than the more complex procedure of inverting a matrix of size L×L.

The above approximations may significantly reduce the computational complexity associated with calculating the compensation coefficients $H_{2N}(j)$. However, the inversion of 2N elements may still prove costly when N is large.

According to the technology described herein, RLS equalization may be implemented using an approximation that involves inversion of a vector of length L (as opposed to a vector of length 2N, or a matrix of size L×L).

There is first introduced a time-domain matrix $\hat{s}_{L\times L}(j)$ defined as follows:

$$\hat{s}_{L\times L}(j)=(W_{2N\times L}^{10})^\dagger F_{2N\times 2N}^{-1} S_{2N\times 2N}(j) F_{2N\times 2N} W_{2N\times L}^{10}. \quad [8]$$

As previously noted, the covariance matrix $S_{2N\times 2N}(j)$ is a diagonal matrix, so it follows that the expression $F_{2N\times 2N}^{-1} S_{2N\times 2N}(j) F_{2N\times 2N}$ is circulant. However, as a result of the windowing operation performed by the terms $(W_{2N\times L}^{10})^\dagger$ and $W_{2N\times L}^{10}$, the matrix $\hat{s}_{L\times L}(j)$ is not circulant. A circular shift of the middle column of the matrix $\hat{s}_{L\times L}(j)$ (i.e., the column corresponding to the floor of (L/2), also denoted by $$\left\lfloor \frac{L}{2} \right\rfloor)$$

results in a corresponding circulant time-domain matrix which is denoted by $\tilde{s}_{L\times L}(j)$. Because the matrix $\tilde{s}_{L\times L}(j)$ is circulant, it follows that the expression $F_{L\times L}\tilde{s}_{L\times L}(j)F_{L\times L}^{-1}$ is a diagonal matrix, where $F_{L\times L}$ denotes the L-FFT matrix, and where $F_{L\times L}^{-1}$ denotes the L-IFFT matrix. The diagonal terms of the matrix $F_{L\times L}\tilde{s}_{L\times L}(j)F_{L\times L}^{-1}$ may be determined by calculating the L-FFT of the first column of matrix $\tilde{s}_{L\times L}(j)$. Accordingly, using previously defined notation, the matrix $F_{L\times L}\tilde{s}_{L\times L}(j)F_{L\times L}^{-1}$ may be expressed as diagmat($F_{L\times L}$(firstcol[$\tilde{s}_{L\times L}(j)$])). Furthermore, since $\tilde{s}_{L\times L}(j)$ is generated by a circular shift of the middle column of $\hat{s}_{L\times L}(j)$, which is expressed in Equation 8, it follows that (firstcol[$\tilde{s}_{L\times L}(j)$]) may be expressed as $$\left((W_{2N\times L}^{10})^\dagger circshift\left(F_{2N\times 2N}^{-1}\operatorname{diag}vec(X_{2N\times 2N}^\dagger(j)X_{2N\times 2N}(j)),\left\lfloor\frac{L}{2}\right\rfloor\right),-\left\lfloor\frac{L}{2}\right\rfloor\right).$$

It is herein proposed that, rather than calculating $H_{2N}(j)$ using Equation 3, $H_{2N}(j)$ may instead be calculated as follows:

$$H_{2N}(j)=H_{2N}(j-1)+\mu F_{2N\times 2N}W_{2N\times L}^{10}F_{L\times L}^{-1}[\tilde{S}_{L\times L}(j-1)+$$
$$\delta I_{L\times L}]^{-1}F_{L\times L}\cdot(W_{2N\times L}^{10})^\dagger F_{2N\times 2N}^{-1}X_{2N\times 2N}^\dagger(j-1)$$
$$E_{2N}(j-1) \quad [9]$$

where δ denotes a regularization parameter, and where $\tilde{S}_{L\times L}(j)$ denotes a diagonal frequency-domain matrix. The regularization parameter δ ensures that the matrix being inverted is not singular and there is no division by zero. The value of δ may be proportional to the power of the input signal. According to some examples, the value of δ may be in the range of $2^{-10}$ to $2^{-6}$ times the input power. The matrix $\tilde{S}_{L\times L}(j)$ may be expressed as:

$$\tilde{S}_{L \times L}(j) = \quad [10]$$

$$\lambda \tilde{S}_{L \times L}(j-1) + \frac{(1-\lambda)}{2} \text{diag}mat\left(F_{L \times L} circshift\left((W_{2N \times L}^{10})^\dagger \cdot circshift\right.\right.$$

$$\left.\left.\left(F_{2N \times 2N}^{-1} \text{diag}vec(X_{2N \times 2N}^\dagger(j) X_{2N \times 2N}(j)), \left\lfloor \frac{L}{2} \right\rfloor\right), -\left\lfloor \frac{L}{2} \right\rfloor\right]\right).$$

Thus, in contrast to the 2N inversions required to calculate the compensation coefficients $H_{2N}(j)$ using the approximations of Equations 6 and 7, only L inversions are required to calculate the compensation coefficients $H_{2N}(j)$ using Equations 9 and 10, where L may be significantly lower than 2N. Thus, by configuring the digital signal processing to implement Equation 9 (using $\tilde{S}_{L \times L}(j)$ as defined in Equation 10), it may be possible to reduce the computational complexity associated with RLS equalization, which in turn may offer various advantages, such as reduced power and heat. According to some examples, the matrix $\tilde{S}_{L \times L}(j-1)$, or alternatively the matrix $[\tilde{S}_{L \times L}(j-1) + \delta I_{L \times L}]$, may be referred to as an approximate covariance matrix.

Returning to FIG. 3, the compensation coefficients 306 are dependent on the product of the error signals 325 associated with a given FFT block and the conjugate of the signals 304 for that same FFT block. The following example will consider the compensation coefficients 306 to be applied to the $j^{th}$ FFT block of the signals 304.

As a result of the feedback design of the digital signal processing 300, the compensation coefficients 306 that are applied by the filter 305 for a given FFT block are dependent on error signals 325 that are calculated from a previous FFT block. Ideally, the filter that is applied to the $j^{th}$ FFT block would use compensation coefficients calculated from the immediately preceding FFT block (j−1). However, in reality, the time required to generate the error signals 325 leads to a delay in the updating of the compensation coefficients. For example, the compensation coefficients 306 that are applied by the filter 305 for FFT block j may have been calculated using an FFT block (j−D−1), where D is a positive integer denoting a number of FFT blocks. Equivalently, the compensation coefficients 306 that are applied by the filter 305 for FFT block (j+1) may have been calculated using an FFT block (j−D). According to one example, D=50. In the present example, the delay D may reflect the delay experienced by the error signals 325 as a result of the inherent delays associated with the operations 308, 310, 312, 314, 316, 318, 320, 322, and 324. Techniques that may be used to account for the delay D in the calculation of the compensation coefficients will be described with respect to FIGS. 4 and 5.

According to Equation 9, the compensation coefficients $H_{2N}$ for the $j^{th}$ block are ideally calculated as a function of the product of $X_{2N \times 2N}^\dagger(j-1)$ and $E_{2N}(j-1)$. However, the following example assumes that $H_{2N}(j)$ is calculated as a function of $X_{2N \times 2N}^\dagger(j-D-1)$ and $E_{2N}(j-D-1)$. Thus, as illustrated in FIG. 3, a conjugate operation 326 may be applied to the signals 304, thereby resulting in respective signals 327. A delay D may be applied to the signals 327 by the delay operation 328, thereby resulting in respective signals 329. The signals 329 may be expressed as $X_{2N \times 2N}^\dagger(j-D-1)$, which is the Hermitian of $X_{2N \times 2N}(j-D-1)$.

A multiplication operation 330 may be applied to the signals 329 and the signals 325, thereby resulting in respective signals 331 which may be expressed as the product $X_{2N \times 2N}^\dagger(j-D-1) E_{2N}(j-D-1)$. A 2N-IFFT operation 332 may be applied to the signals 331, thereby resulting in respective time-domain signals 333. A windowing operation 334 may be applied to the signals 333, thereby resulting in respective signals 335 which may have improved SNR. Such windowing is described, for example, in U.S. Pat. No. 8,005,368 to Roberts et al., U.S. Pat. No. 8,385,747 to Roberts et al., U.S. Pat. No. 9,094,122 to Roberts et al., and U.S. Pat. No. 9,590,731 to Roberts et al. Other filtering may be used instead of or in addition to the time-domain window 334. An L-FFT operation 336 is applied to the signals 335, thereby resulting in respective frequency-domain signals 337 which may be expressed as $F_{L \times L}(W_{2N \times L}^{10})^\dagger F_{2N \times 2N}^{-1} X_{2N \times 2N}^\dagger(j-D-1) E_{2N}(j-D-1)$, where $F_{L \times L}$ reflects the L-FFT operation 336, where the matrix $(W_{2N \times L}^{10})^\dagger$ reflects the windowing operation 334, and where $F_{2N \times 2N}^{-1}$ reflects the 2N-IFFT operation 332.

A covariance calculation operation 339 is applied to the signals 304 and to the conjugate signals 327, thereby resulting in respective signals 340 which may be expressed as the product $X_{2N \times 2N}^\dagger(j-1) X_{2N \times 2N}(j-1)$. A 2N-IFFT operation 341 is applied to the signals 340, thereby resulting in respective signals 342 which may be expressed as $$circshift\left(F_{2N \times 2N}^{-1} \text{diag}vec(X_{2N \times 2N}^\dagger(j-1) X_{2N \times 2N}(j-1)), \left\lfloor \frac{L}{2} \right\rfloor\right).$$

A windowing operation 343 is applied to the time-domain signals 342, thereby resulting in respective signals 344 which may be expressed as $$circshift\left((W_{2N \times L}^{10})^\dagger\right.$$

$$\left.circshift\left(F_{2N \times 2N}^{-1} \text{diag}vec(X_{2N \times 2N}^\dagger(j-1) X_{2N \times 2N}(j-1)), \left\lfloor \frac{L}{2} \right\rfloor\right), -\left\lfloor \frac{L}{2} \right\rfloor\right).$$

An L-FFT operation 345 is applied to the windowed time-domain signals 344, thereby resulting in respective signals 346 which may be expressed as $$\text{diag}mat\left(F_{L \times L} circshift\left((W_{2N \times L}^{10})^\dagger circshift\right.\right.$$

$$\left.\left.\left(F_{2N \times 2N}^{-1} \text{diag}vec(X_{2N \times 2N}^\dagger(j-1) X_{2N \times 2N}(j-1)), \left\lfloor \frac{L}{2} \right\rfloor\right), -\left\lfloor \frac{L}{2} \right\rfloor\right)\right).$$

An averaging operation 347 is applied to the signals 346, thereby resulting in respective signals 348 which, for a given dimension or polarization of the received signal, may be expressed as the diagonal matrix $\tilde{S}_{L \times L}(j-1)$ according to the definition in Equation 10.

An inversion operation 349 may be applied to the signals 348 using the regularization parameter $\delta$, thereby resulting in respective signals 350 corresponding to the term $[\tilde{S}_{L \times L}(j-1) + \delta I_{L \times L}]^{-1}$ in Equation 9. Because the matrix $\tilde{S}_{L \times L}(j-1)$ for each dimension or polarization is diagonal, inversion of the matrix only requires the inversion of L elements. A matching delay 351 may be applied to the signals 350, such that the resulting signals 352 are representative of $[\tilde{S}_{L \times L}(j-D-1) + \delta I_{L \times L}]^{-1}$.

A multiplication operation 338 may be applied to the signals 337 and the signals 352, thereby resulting in respective signals 353 which may be expressed as the product $[\tilde{S}_{L \times L}(j-1) + \delta I_{L \times L}]^{-1} F_{L \times L}(W_{2N \times L}^{10})^\dagger F_{2N \times 2N}^{-1} X_{2N \times 2N}^\dagger(j-D-1) E_{2N}(j-D-1)$. An L-IFFT operation 354 is applied to the signals 353, thereby resulting in respective signals 355 which are expressed as $F_{L \times L}^{-1}[\tilde{S}_{L \times L}(j-D-1)+\delta I_{L \times L}]^{-1}F_{L \times L}$ $(W_{2N \times L}^{10})^\dagger F_{2N \times 2N}^{-1} X_{2N \times 2N}^\dagger (j-D-1) E_{2N}(j-D-1)$.

An accumulation operation 356 may be applied to the signals 355, thereby resulting in respective signals 357, which may be expressed as:

$$\hat{h}_L(j) = \hat{h}_L(j-1) + \mu F_{L \times L}^{-1}[\tilde{S}_{L \times L}(j-D-1)+\delta I_{L \times L}]^{-1}F_{L \times L} \cdot (W_{2N \times L}^{10})^\dagger F_{2N \times 2N}^{-1} X_{2N \times 2N}^\dagger(j-D-1) E_{2N}(j-D-1) \quad [11]$$

where $\hat{h}_L(j)$ is a vector denoting the time-domain compensation coefficients for the $j^{th}$ block, where $\hat{h}_L(j-1)$ is a vector denoting the time-domain compensation coefficients for the $(j-1)^{th}$ block.

A zero padding operation 358 may be applied to the signals 357, thereby resulting in respective signals 359. A 2N-FFT operation 360 may be applied to the signals 359, thereby resulting in the respective signals 306, which may be expressed as:

$$H_{2N}(j) = H_{2N}(j-1) + \mu F_{2N \times 2N} W_{2N \times L}^{10} F_{L \times L}^{-1}[\tilde{S}_{L \times L}(j-D-1)+\delta I_{L \times L}]^{-1} F_{L \times L} \cdot (W_{2N \times L}^{10})^\dagger F_{2N \times 2N}^{-1} X_{2N \times 2N}^\dagger (j-D-1) E_{2N}(j-D-1) \quad [12]$$

where $H_{2N}(j)=F_{2N \times 2N} W_{2N \times L}^{10} \hat{h}_L(j)$ is a vector denoting the frequency-domain compensation coefficients for the $j^{th}$ block (corresponding to the current values of the signals 306, where $H_{2N}(j-1)=F_{2N \times 2N} W_{2N \times L}^{10} \hat{h}_L(j-1)$ is a vector denoting the frequency-domain compensation coefficients for the $(j-1)^{th}$ block (corresponding to the values of the signals 306 for the immediately preceding clock cycle), where $F_{2N \times 2N}$ denotes the 2N-FFT matrix (corresponding to the operation 360), and where $W_{2N \times L}^{10}$ is a zero-padding matrix (corresponding to the operation 358).

By generating the compensation coefficients $H_{2N}(j)$ using the processing 300, it is possible to perform an approximation of RLS equalization that is less computationally expensive than other proposed methods.

It is apparent in Equation 12 that the compensation coefficients used for the $j^{th}$ FFT block, $H_{2N}(j)$, are dependent on error values $E_{2N}(j-D-1)$ that are outdated by the delay D. As a result of this delay, the approximated RLS equalizer illustrated in FIG. 3 may be unable to track and compensate for relatively fast changes in the channel response. This may limit the SNR that is achievable, for example, in the presence of SOP transients.

For a FFT block being filtered at a current clock cycle j, it may be of interest to apply compensation coefficients that have been calculated using information from the most recent clock cycle (j−1), rather than using stale information from an older clock cycle (j−D−1). In other words, rather than $H_{2N}(j)$ being dependent on $X_{2N \times 2N}^\dagger (j-D-1)$ and $E_{2N}(j-D-1)$, it may be of interest to make $H_{2N}(j)$ effectively dependent on $X_{2N \times 2N}^\dagger(j-1)$ and $E_{2N}(j-1)$, thereby compensating for the effect of the delay D on the value of $H_{2N}(j)$. As will now be described in more detail, this delay compensation may be achieved using a series of processing steps designed to apply an appropriate adjustment to the compensation coefficients $H_{2N}(j)$. Referring back to Equation 3, compensation for a delay D may be achieved by adding a vector $A_{2N}(j)$ to the error vector $E_{2N}(j-D-1)$, as expressed below:

$$H_{2N}(j) = H_{2N}(j-1) + \mu F_{2N \times 2N} W_{2N \times L}^{10} [(W_{2N \times L}^{10})^\dagger F_{2N \times 2N}^{-1} S_{2N \times 2N}(j-D-1) F_{2N \times 2N} W_{2N \times L}^{10}]^{-1} \cdot (W_{2N \times L}^{10})^\dagger F_{2N \times 2N}^{-1} X_{2N \times 2N}^\dagger(j-D-1)[E_{2N}(j-D-1) + A_{2N}(j)] \quad [13]$$

where the vector $A_{2N}(j)$ is expressed as:

$$A_{2N}(j) = \alpha U_{2N \times 2K} F_{2K \times 2K} (W_{K \times 2K}^{01})^\dagger W_{K \times 2K}^{01} F_{2K \times 2K}^{-1} U_{2N \times 2K}^\dagger X_{2N \times 2N}(j-D-1) \Delta H_{2N}(j-1) \quad [14]$$

where α is a real number in the range [0 . . . 1] reflecting the degree of delay compensation, and where $\Delta H_{2N}(j)$ is a vector expressed as:

$$\Delta H_{2N}(j) = H_{2N}(j-D-1) - H_{2N}(j-1). \quad [15]$$

The term $F_{2K \times 2K}(W_{K \times 2K}^{01})^\dagger W_{K \times 2K}^{01} F_{2K \times 2K}^{-1}$ in Equation 14 may be simplified to $$\frac{1}{2} I_{2K \times K}.$$

Furthermore, in the event that the roll-off factor of the pulse shaping (e.g., the product of transmitter filtering and receiver filtering which, in the case of matched filtering, may comprise, for example, the product of two root raised cosine filters) is close to zero, then $U_{2N \times 2K} U_{2N \times 2K}^\dagger$ may also be approximated by $I_{2N \times 2N}$. Under these circumstances, the vector $A_{2N}(j)$ may be simplified to $$A_{2N}(j) = \frac{1}{2} \alpha X_{2N \times 2N}(j-D-1) \Delta H_{2N}(j),$$

and Equation 13 may be rewritten as:

$$H_{2N}(j) = H_{2N}(j-1) + \mu F_{2N \times 2N} \quad [16]$$
$$W_{2N \times L}^{10} [(W_{2N \times L}^{10})^\dagger F_{2N \times 2N}^{-1} S_{2N \times 2N}(j-D-1) F_{2N \times 2N} W_{2N \times L}^{10}]^{-1} \cdot$$
$$(W_{2N \times L}^{10})^\dagger F_{2N \times 2N}^{-1} X_{2N \times 2N}^\dagger(j-D-1)$$
$$\left[ E_{2N}(j-D-1) + \frac{1}{2} \alpha X_{2N \times 2N}(j-D-1) \Delta H_{2N}(j-1) \right]$$

The vector $A_{2N}(j)$ is designed to compensate for the difference between $H_{2N}(j-D-1)$ and $H_{2N}(j-1)$, thereby compensating for the presence of the delay D in Equation 3. In other words, the vector $A_{2N}(j)$ comprises delay compensation terms which are used to modify the filter coefficients $H_{2N}(j)$ to achieve a more up-to-date equalization of the incoming signals. Notably, in the event that α=0, there is no delay compensation applied (i.e., $A_{2N}(j)=0$ and Equation 16 is identical to Equation 3). In that event that α=1, the full amount of delay compensation is applied. In practice, α may be set to a value between zero and one, such that only a portion of the full delay compensation is applied, thereby reducing the likelihood that an erroneous symbol estimate 315 will result in a large error in $H_{2N}(j)$.

A further simplification of Equation 16 may be achieved by using the statistical expectation of the covariance term $X_{2N \times 2N}^\dagger(j-D-1) X_{2N \times 2N}(j-D-1)$, expressed as follows:

$$H_{2N}(j) = H_{2N}(j-1) + \mu F_{2N \times 2N} \quad [17]$$
$$W_{2N \times L}^{10} [(W_{2N \times L}^{10})^\dagger F_{2N \times 2N}^{-1} S_{2N \times 2N}(j-D-1) F_{2N \times 2N} W_{2N \times L}^{10}]^{-1} \cdot$$
$$(W_{2N \times L}^{10})^\dagger F_{2N \times 2N}^{-1} \left[ X_{2N \times 2N}^\dagger(j-D-1) E_{2N}(j-D-1) + \right.$$
$$\left. \frac{1}{2} \alpha \varepsilon \{ X_{2N \times 2N}^\dagger(j-D-1) X_{2N \times 2N}(j-D-1) \} \Delta H_{2N}(j-1) \right]$$

where ε{ } denotes the expectation.

It may be shown that the following approximation holds true:

$$\varepsilon \{ X_{2N \times 2N}^\dagger(j-D-1) X_{2N \times 2N}(j-D-1) \} = 2 \cdot \varepsilon \{ X_{2N \times 2N}^\dagger(j-D-1) U_{2N \times 2K} F_{2K \times 2K} (W_{K \times 2K}^{01})^\dagger W_{K \times 2K}^{01} F_{2K \times 2K}^{-1} U_{2N \times 2K}^\dagger X_{2N \times 2N}(j-D-1) \} \quad [18]$$

It follows that $\varepsilon\{X_{2N\times 2N}^\dagger(j-D-1)X_{2N\times 2N}(j-D-1)\}$ may be approximated as the $2 \cdot S_{2N\times 2N}(j-D-1)$, where $S_{2N\times 2N}(j)$ is as expressed in Equation 5.

Where the matrix $2 \cdot S_{2N\times 2N}(j-D-1)$ is used in place of the expectation $\varepsilon\{X_{2N\times 2N}^\dagger(j-D-1)X_{2N\times 2N}(j-D-1)\}$, Equation 17 may be rewritten as:

$$H_{2N}(j)=H_{2N}(j-1)+\mu F_{2N\times 2N}W_{2N\times L}{}^{10}[(W_{2N\times L}{}^{10})^\dagger F_{2N\times 2N}^{-1}S_{2N\times 2N}(j-1)F_{2N\times 2N}W_{2N\times L}{}^{10}]^{-1} \cdot (W_{2N\times L}{}^{10})^\dagger F_{2N\times 2N}^{-1}[X_{2N\times 2N}^\dagger(j-D-1)E_{2N}(j-D-1)+\alpha S_{2N\times 2N}(j-D-1)\Delta H_{2N}(j-1)] \quad [19]$$

In turn, Equation 19 may be rewritten as:

$$H_{2N}(j)=H_{2N}(j-1)+\mu F_{2N\times 2N}W_{2N\times L}{}^{10}[(W_{2N\times L}{}^{10})^\dagger F_{2N\times 2N}^{-1}S_{2N\times 2N}(j-D-1)F_{2N\times 2N}W_{2N\times L}{}^{10}]^{-1} \cdot (W_{2N\times L}{}^{10})^\dagger F_{2N\times 2N}^{-1}X_{2N\times 2N}^\dagger(j-D-1)[E_{2N}(j-D-1)+\alpha\mu\Delta H_{2N}(j-1)] \quad [20]$$

Equation 20 represents the frequency-domain compensation coefficients $H_{2N}(j)$ for RLS equalization using statistical delay compensation. A comparison of Equation 20 to Equation 3 shows that the delay compensation is achieved by simply adding the term $\alpha\mu\Delta H_{2N}(j-1)$. Furthermore, as explained previously, the expression $[(W_{2N\times L}{}^{10})^\dagger F_{2N\times 2N}^{-1} S_{2N\times 2N}(j-D-1)F_{2N\times 2N}W_{2N\times L}{}^{10}]^{-1}$ may be simplified to $F_{L\times L}^{-1}[\tilde{S}_{L\times L}(j-1)+\delta I_{L\times L}]^{-1}F_{L\times L}$, where $\tilde{S}_{L\times L}(j)$ is the diagonal frequency-domain matrix expressed in Equation 10. With this simplification, an approximation of the frequency-domain compensation coefficients $H_{2N}(j)$ for RLS equalization using statistical delay compensation is expressed as:

$$H_{2N}(j)=H_{2N}(j-1)+\mu F_{2N\times 2N}W_{2N\times L}{}^{10}F_{L\times L}^{-1}[\tilde{S}_{L\times L}(j-1)+\delta I_{L\times L}]^{-1}F_{L\times L} \cdot (W_{2N\times L}{}^{10})^\dagger F_{2N\times 2N}^{-1}X_{2N\times 2N}^\dagger(j-D-1)E_{2N}(j-D-1)+\alpha\mu\Delta H_{2N}(j-1) \quad [21]$$

Figure 4:
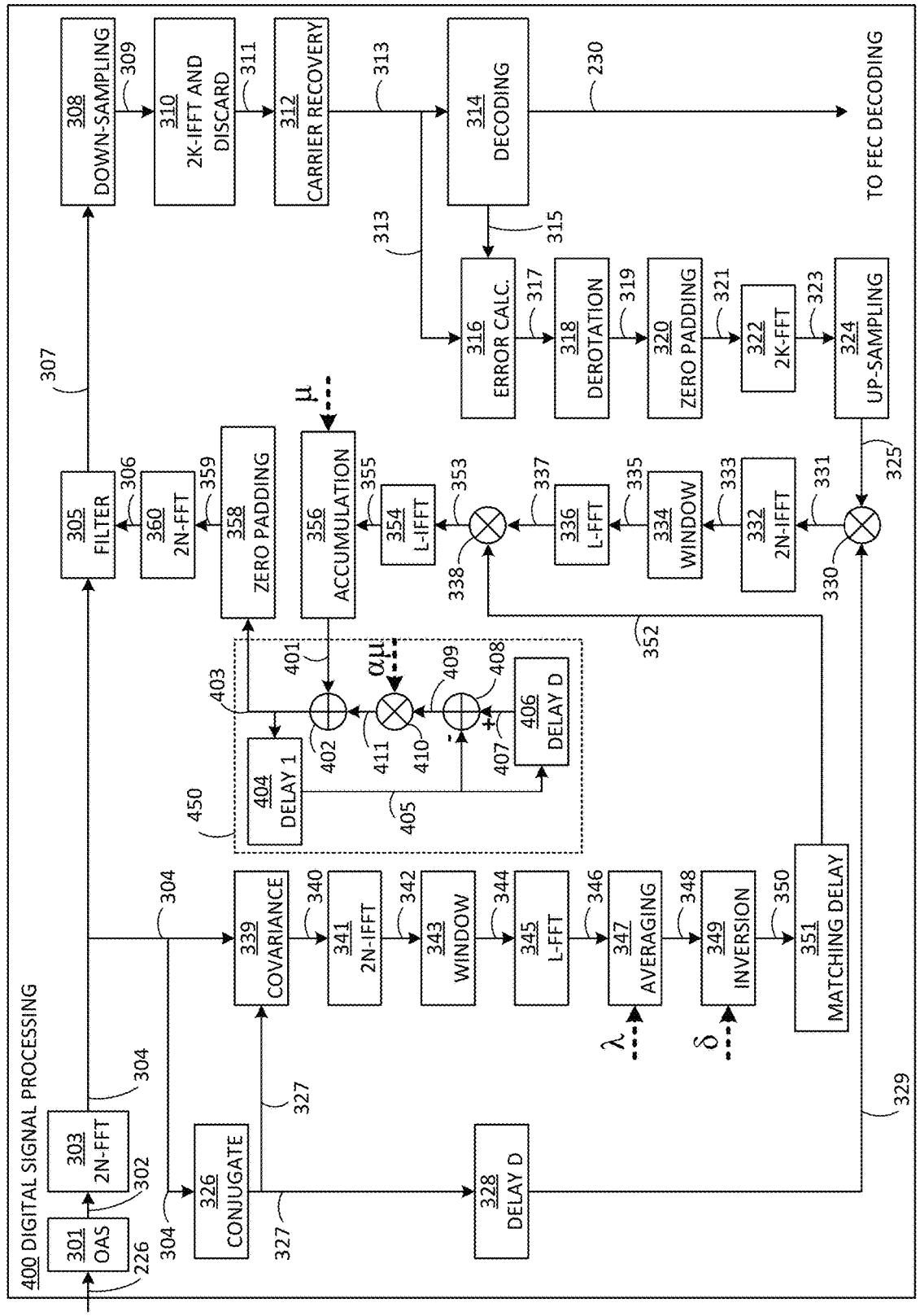
FIG. 4 illustrates digital signal processing for an approximation of RLS equalization in accordance with a second example of the technology disclosed herein.

FIG. 4 illustrates digital signal processing 400 for an approximation of RLS in accordance with a second example of the technology disclosed herein. The digital signal processing 400 is an example of the digital signal processing 228 shown in FIG. 2. The digital signal processing 400 includes all of the processing operations of the digital signal processing 300, as well as additional processing operations designed to achieve the statistical delay compensation of Equation 21.

As described above, the statistical delay compensation may be achieved by adding the term $\alpha\mu\Delta H_{2N}(j-1)$ to the calculation of the compensation coefficients $H_{2N}(j)$. An example of processing that may be used to implement this is shown in box 450.

The accumulation operation 356 generates signals 401 which are representative of the time-domain compensation coefficients $\hat{h}_L(j)$. The signals 401 are added to signals 411 by an addition operation 402, thereby resulting in respective signals 403. The signals 411 are a function of the values of $\hat{h}_L$ at a previous block. In addition to being output from the box 450, the signals 403 undergo a delay of 1 block by a delay operation 404, thereby resulting in respective signals 405 denoted by $\hat{h}_L(j-1)$. The signals 405 undergo a delay of D blocks by a delay operation 406, thereby resulting in respective signals denoted by $\hat{h}_L(j-D-1)$. A difference operation 408 is applied to the signals 405 and the signals 407, thereby resulting in respective difference signals 409 which are expressed as:

$$\Delta\hat{h}_L(j)=\hat{h}_L(j-D-1)-\hat{h}_L(j-1) \quad [22]$$

The vector $\Delta\hat{h}_L(j)$ is the time-domain version of the vector $\Delta H_{2N}(j)$ expressed in Equation 15.

A multiplication operation 410 calculates the product of the signals 409 and the constant $\alpha\mu$, thereby resulting in the respective signals 411 which are expressed as $\alpha\mu\Delta\hat{h}_L(j)$. The signals 411 are then added to the signals 401 of the $(j+1)^{th}$ block.

Accordingly, for a given block j, the signals 403 output by the box 450 may be expressed as:

$$\hat{h}_L(j)=\hat{h}_L(j-1)+\mu F_{L\times L}^{-1}[\tilde{S}_{L\times L}(j-D-1)30\ \delta I_{L\times L}]^{-1}F_{L\times L} \cdot (W_{2N\times L}{}^{10})^\dagger F_{2N\times 2N}^{-1}X_{2N\times 2N}^\dagger(j-D-1)E_{2N}(j-D-1)+\alpha\mu\Delta\hat{h}_L(j-1) \quad [23]$$

The signals 403 may undergo the zero padding operation 358 and the 2N-FFT operation 360, thereby resulting in the respective signals 306 that are representative of the frequency-domain compensation coefficients $H_{2N}(j)$. As a result of the digital signal processing 400 shown in FIG. 4, the signals 306 are expressed by Equation 21, where $\Delta H_{2N}(j-1)=F_{2N\times 2N}W_{2N\times L}{}^{10}\Delta\hat{h}_L(j-1)$.

Figure 5:
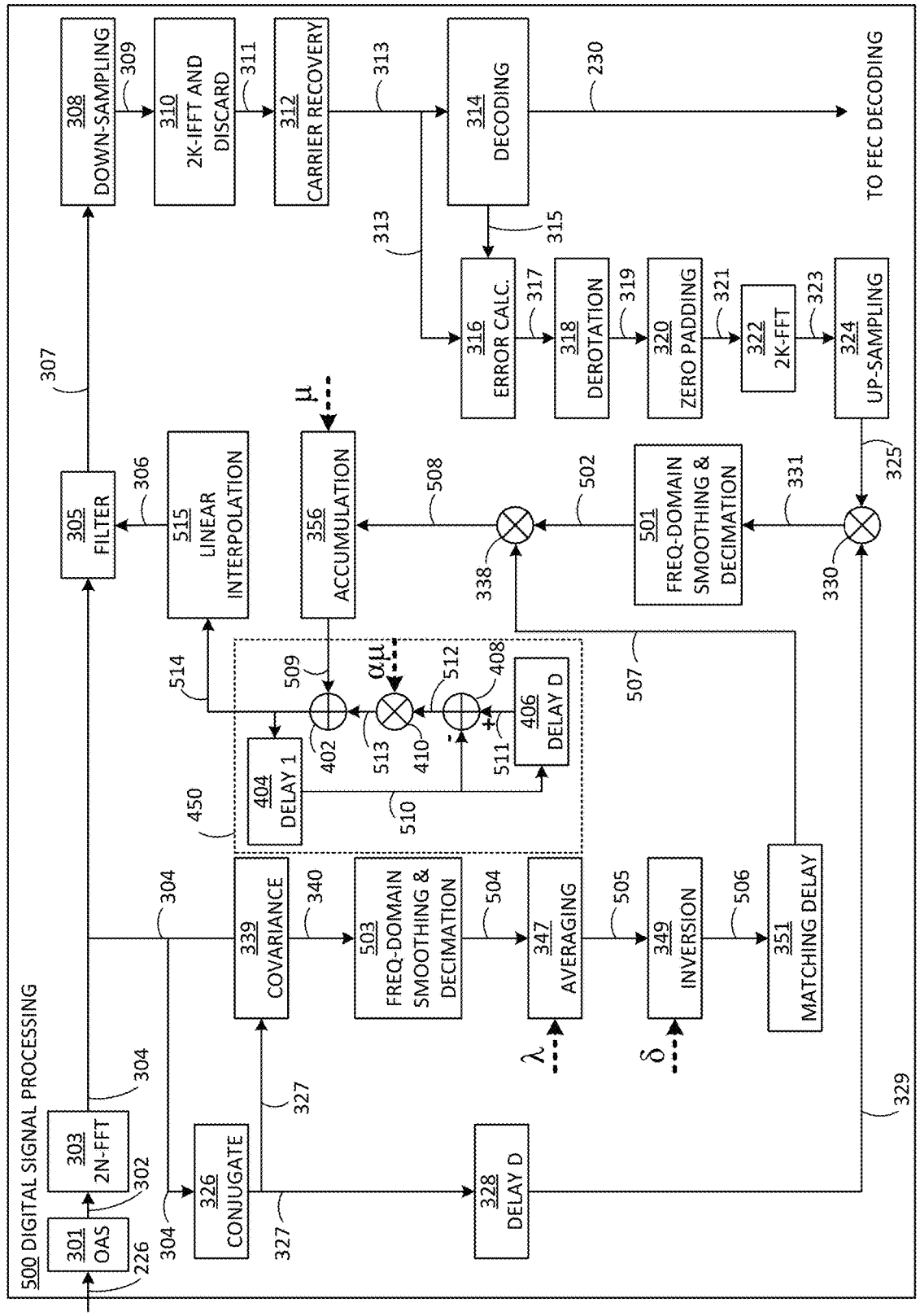
FIG. 5 illustrates digital signal processing for an approximation of RLS equalization in accordance with a third example of the technology disclosed herein.

FIG. 5 illustrates digital signal processing 500 for an approximation of RLS in accordance with a third example of the technology disclosed herein. The digital signal processing 500 is an example of the digital signal processing 228 shown in FIG. 2.

As described in the preceding examples, the multiplication operation 330 generates signals 331 which may be expressed as $X_{2N\times 2N}^\dagger(j-D-1)E_{2N}(j-D-1)$. However, in place of the 2N-IFFT operation 332, the windowing operation 334, and the L-FFT operations 337 and 345 illustrated in FIGS. 3 and 4, frequency-domain smoothing and decimation operations 501 and 503 are used. The frequency-domain smoothing may be implemented, for example, as described in U.S. Pat. No. 8,005,368 to Roberts et al., U.S. Pat. No. 8,385,747 to Roberts et al., U.S. Pat. No. 9,094,122 to Roberts et al., and U.S. Pat. No. 9,590,731 to Roberts et al. As shown in FIG. 5, the operation 501 is applied to the signals 331, thereby resulting in respective signals 502 which represent smoothed, decimated versions of the signals 331. The operation 503 is applied to the signals 340, thereby resulting in signals 504 which represent smoothed, decimated versions of the signals 340.

The averaging operation 347 is applied to the signals 504, thereby resulting in respective signals 505. The inversion operation 349 is applied to the signals 505, thereby resulting in respective signals 506. The matching delay 351 is applied to the signals 506, thereby resulting in respective signals 507. The multiplication operation 338 multiplies the signals 502 by the signals 507, thereby resulting in respective signals 508 that are input to the accumulation operation 356.

The signals 508 are frequency-domain signals, rather than time-domain signals. Accordingly, the accumulation operation 356 generates respective frequency-domain signals 509 which are representative of the frequency-domain compensation coefficients $H_L(j)$. The delay operation 404 generates frequency-domain signals 510 which are representative of the frequency-domain compensation coefficients of the preceding clock cycle, that is $H_L(j-1)$. The signals 510 undergo the delay D applied by the delay operation 406, thereby resulting in respective signals 511 denoted by $H_L(j-D-1)$. The difference operation 408 is applied to the signals 510 and the signals 511, thereby resulting in respective difference signals 512 which are expressed as:

$$\Delta H_L(j)=H_L(j-D-1)-H_L(j-1) \quad [24]$$

The multiplication operation 410 calculates the product of the signals 516 and the constant $\alpha\mu$, thereby resulting in the respective signals 513 which are expressed as $\alpha\mu\Delta H_L(j)$. The signals 513 are then added to the signals 509 of the $(j+1)^{th}$ block, thereby resulting in signals 514.

In this example, in place of the L-IFFT operation 354, the zero padding operation 358, and the 2N-FFT operation 360 illustrated in FIGS. 3 and 4, a linear interpolation operation 515 is used. The linear interpolation operation 515 is implemented in the frequency domain and is used to take an input vector of length L and output a vector of length 2N. As shown in FIG. 5, the linear interpolation operation 515 is applied to the signals 514, thereby resulting in the respective signals 306 that are representative of the frequency-domain compensation coefficients $H_{2N}(j)$ to be used by the filter 305.

Figure 6:
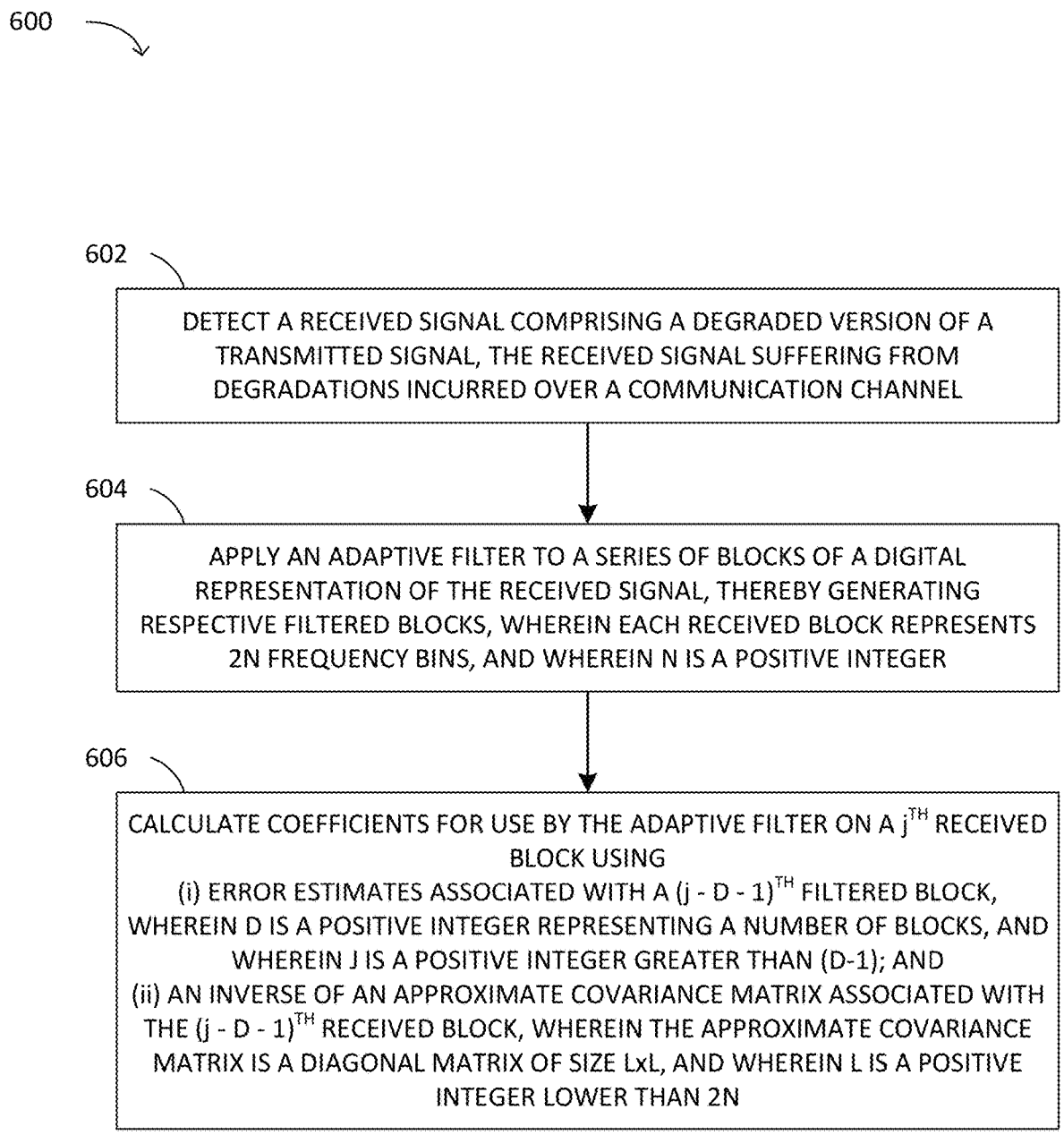
FIG. 6 illustrates an example method for performing an approximation of RLS equalization in accordance with some examples of the technology disclosed herein.

FIG. 6 illustrates an example method 600 for performing an approximation of RLS equalization in accordance with some examples of the technology disclosed herein. According to some examples, the method 600 may be performed at a receiver device, such as the receiver device 104 or 200.

At 602, the receiver device detects a received signal comprising a degraded version of a transmitted signal, the received signal suffering from degradations incurred over a communication channel, such as the communication channel 106 between the transmitter device 102 and the receiver device 104. According to some examples, the transmitted signal and the received signal are optical signals. According to one example, as described with respect to FIG. 2, the received optical signal 204 may be detected by a communication interface of the receiver device 200. The polarizing beam splitter 206 may split the optical signal 204 into the polarized components 208, which may be processed by the optical hybrid 210, thereby resulting in the optical signals 216. The photodetectors 218 may convert the optical signals 216 into the analog signals 220, and the ADCs 224 may generate the respective digital signals 226 from the analog signals 220. According to some examples, the received signal may be representative of data and FEC redundancy that is dependent on the data, the FEC redundancy having been generated as a result of the data having undergone FEC encoding, for example, at the transmitter device 102. According to some examples, the received signal may be representative of symbols. The symbols may include one or more predetermined symbols (also referred to as training symbols).

At 604, the receiver device applies an adaptive filter to a series of received blocks of a digital representation of the received signal, thereby generating respective filtered blocks, where each received block represents 2N frequency bins, and where N is a positive integer. For example, the adaptive filter applied at 604 may comprise the filter 305 as described with respect to any one of FIGS. 3, 4, and 5. As part of the digital signal processing 228 (and 300, 400, and 500), the adaptive filter applied at 604 may be implemented by circuitry such as the ASIC 222, either in the time domain or the frequency domain. According to one example, the digital representation of the received signal may refer to the time-domain signals 226 generated by the ADCs 224. According to another example, the digital representation of the received signal may refer to the frequency-domain signals 308. In general, a received block may be understood as comprising a digital representation of a plurality of samples of the received signal detected at the communication interface over a period of time.

At 606, the receiver device calculates coefficients for use by the adaptive filter on a $j^{th}$ received block. The coefficients are calculated as a function of (i) error estimates associated with a $(j-D-1)^{th}$ filtered block, where D is a positive integer representing a number of blocks, and where j is a positive integer greater than (D-1), and (ii) an inverse of an approximate covariance matrix associated with the $(j-D-1)^{th}$ received block, where the approximate covariance matrix is a diagonal matrix of size L×L, and where L is a positive integer lower than 2N, that is L<2N. According to some examples, L may be significantly lower than 2N, that is L<<2N. According to one example, L could be on the order of 30, while 2N could be on the order of 1024. The error estimates may be represented, for example, by the signals 317 or the signals 325, or any of the intermediate signals 319, 321, or 323. The inverse of the approximate covariance matrix may be represented, for example, by the signals 350 or 506 (or by the signals 352 or 507). As previously noted, the inversion of a diagonal matrix of size L×L amounts to inverting a vector of length L. This may offer a substantial reduction in computational complexity (e.g., processing time) relative to the approximation of Equation 7, which involves an inversion of 2N elements.

According to some examples, the approximate covariance matrix (of which the inverse is used at 606) may be expressed in the frequency domain, such that each one of the L diagonal terms of corresponds to a different frequency. As expressed in Equation 10, the approximate covariance matrix for the $(j-D-1)^{th}$ received block may be calculated as a recursive function of a preceding approximate covariance matrix associated with a preceding received block of the series. For example, the approximate covariance matrix for the $(j-D-1)^{th}$ received block may be calculated as a recursive function of the immediately preceding approximate covariance matrix associated with the $(j-D-2)^{th}$ received block of the series.

According to some examples, the approximate covariance matrix is one of a plurality of sub-matrices comprised in a composite matrix. For example, in the case of a multiple-input multiple-output (MIMO) system (such as a system that processes received signals in the X and Y polarizations), the signals 348 may be expressed as:

$$\tilde{S}_{2L \times 2L}(j-1) = \begin{bmatrix} \tilde{S}_{L \times L}(j-1)_{XX} & \tilde{S}_{L \times L}(j-1)_{XY} \\ \tilde{S}_{L \times L}(j-1)_{YX} & \tilde{S}_{L \times L}(j-1)_{YY} \end{bmatrix} \quad [25]$$

where $\tilde{S}_{L \times L}(j-1)_{XX}$, $\tilde{S}_{L \times L}(j-1)_{XY}$, $\tilde{S}_{L \times L}(j-1)_{YX}$, $\tilde{S}_{L \times L}(j-1)_{YY}$ denote the four diagonal sub-matrices which are approximations of the covariance matrices associated with the X polarization, the XY cross-polarization, the YX cross-polarization, and the Y polarization, respectively, of the received signal. Since each sub-matrix has size L×L, it follows that the composite matrix $\tilde{S}_{2L \times 2L}(j-1)$ has size 2L×2L. In such cases, the method 600 may comprise calculating the coefficients by inverting the composite matrix. In this example, inversion of the composite matrix $\tilde{S}_{2L \times 2L}(j-1)$ involves the inversion of the four diagonal sub-matrices $\tilde{S}_{L \times L}(j-1)_{XX}$, $\tilde{S}_{L \times L}(j-1)_{YX}$, $\tilde{S}_{L \times L}(j-1)_{YY}$, which amounts to inverting four vectors of length L. This is equivalent to inverting L 2×2 diagonal sub-matrices.

According to some examples, the method 600 may further comprise calculating the filter coefficients using delay compensation terms which are dependent on a difference between coefficients used by the adaptive filter on a $(j-D-1)^{th}$ received block and coefficients used by the adaptive filter on a $(j-1)^{th}$ received block. The delay compensation terms may be represented, for example, by the signals 411 or the signals 513.

According to some examples, the proposed techniques for approximating RLS equalization described in this document may be used in conjunction with other equalization operations. For example, although not illustrated in FIGS. 3, 4, and 5, a static equalizer filter may be applied to the signals 304 prior to the approximated RLS equalization, in order to compensate for relatively slow changes in the channel response. Additionally or alternatively, techniques for feed-forward equalization as described in U.S. patent application Ser. No. 16/903,792, filed Jun. 17, 2020, may be used in conjunction with the delay-compensated feedback equalization techniques described herein to compensate for very fast changes in channel response.

In general, various controls and operations may overlap or operate within any of the adaptive filtering loops described in this document, including, for example, clock recovery, jitter suppression, carrier frequency recovery, carrier phase recovery, maximum-likelihood symbol detection, DC offset, transient tracking, noise whitening, quantization, clipping, and gain control.

In general, any of the adaptive filtering loops described in this document may include approximations, quantization, clipping, windowing, DC-balance, leaking, scaling, rounding, filtering, averaging, or various other operations that are not explicitly described but are familiar to persons skilled in the art.

The scope of the claims should not be limited by the details set forth in the examples, but should be given the broadest interpretation consistent with the description as a whole.

What is claimed is:

1. A receiver device comprising:
   a communication interface configured to detect a received signal comprising a degraded version of a transmitted signal, the received signal suffering from degradations incurred over a communication channel; and
   circuitry configured to
      apply an adaptive filter to a series of received blocks of a digital representation of the received signal, thereby generating respective filtered blocks, wherein each received block represents 2N frequency bins, and wherein N is a positive integer; and
      calculate coefficients for use by the adaptive filter on a $j^{th}$ received block using (i) error estimates associated with a $(j-D-1)^{th}$ filtered block, wherein D is a positive integer representing a number of blocks, and wherein j is a positive integer greater than (D−1); and (ii) an inverse of an approximate covariance matrix associated with the $(j-D-1)^{th}$ received block, wherein the approximate covariance matrix is a diagonal matrix of size L×L, and wherein L is a positive integer lower than 2N.

2. The receiver device as claimed in claim 1, wherein the circuitry is further configured to calculate the coefficients for use by the adaptive filter on the $j^{th}$ received block using (iii) delay compensation terms dependent on a difference between coefficients used by the adaptive filter on a $(j-D-1)^{th}$ received block and coefficients used by the adaptive filter on a $(j-1)^{th}$ received block.

3. The receiver device as claimed in claim 1, wherein the approximate covariance matrix is expressed in a frequency domain, and wherein each one of L diagonal terms of the approximate covariance matrix corresponds to a different frequency.

4. The receiver device as claimed in claim 1, wherein the approximate covariance matrix is one of a plurality of sub-matrices comprised in a composite matrix, and wherein the circuitry is further configured to calculate the coefficients using an inverse of each sub-matrix in the composite matrix.

5. The receiver device as claimed in claim 4, wherein the composite matrix consists of four diagonal L×L sub-matrices, each sub-matrix approximating a covariance matrix associated with a different polarization of the received signal.

6. The receiver device as claimed in claim 1, wherein the circuitry is further configured to calculate the approximate covariance matrix for the $(j-D-1)^{th}$ received block as a recursive function of a preceding approximate covariance matrix associated with a preceding received block of the series.

7. The receiver device as claimed in claim 1, wherein each received block comprises a respective digital representation of a plurality of samples of the received signal detected at the communication interface over a period of time.

8. The receiver device as claimed in claim 1, wherein the received signal is representative of symbols, and wherein the circuitry is further configured to
   decode estimates of the symbols represented by the $(j-D-1)^{th}$ filtered block; and
   calculate the error estimates associated with the $(j-D-1)^{th}$ filtered block using the decoded estimates of the symbols.

9. The receiver device as claimed in claim 8, wherein the symbols include one or more predetermined symbols.

10. The receiver device as claimed in claim 1, wherein the communication channel comprises an optical communication channel.

11. A method comprising:
   at a communication interface of a receiver device, detecting a received signal comprising a degraded version of a transmitted signal, the received signal suffering from degradations incurred over a communication channel;
   applying an adaptive filter to a series of received blocks of a digital representation of the received signal, thereby generating respective filtered blocks, wherein each received block represents 2N frequency bins, and wherein N is a positive integer; and
   calculating coefficients for use by the adaptive filter on a $j^{th}$ received block using (i) error estimates associated with a $(j-D-1)^{th}$ filtered block, wherein D is a positive integer representing a number of blocks, and wherein j is a positive integer greater than (D−1); and (ii) an inverse of an approximate covariance matrix associated with the $(j-D-1)^{th}$ received block, wherein the approximate covariance matrix is a diagonal matrix of size L×L, and wherein L is a positive integer lower than 2N.

12. The method as claimed in claim 11, further comprising calculating the coefficients for use by the adaptive filter on the $j^{th}$ received block using (iii) delay compensation terms dependent on a difference between coefficients used by the adaptive filter on a $(j-D-1)^{th}$ received block and coefficients used by the adaptive filter on a $(j-1)^{th}$ received block.

13. The method as claimed in claim 11, wherein the approximate covariance matrix is expressed in a frequency domain and wherein each one of L diagonal terms of the approximate covariance matrix corresponds to a different frequency.

14. The method as claimed in claim 11, wherein the approximate covariance matrix is one of a plurality of sub-matrices comprised in a composite matrix, the method further comprising calculating the coefficients using an inverse of each sub-matrix in the composite matrix.

15. The method as claimed in claim 14, wherein the composite matrix consists of four diagonal L×L sub-matrices, each sub-matrix approximating a covariance matrix associated with a different polarization of the received signal.

16. The method as claimed in claim 11, further comprising calculating the approximate covariance matrix for the $(j-D-1)^{th}$ received block as a recursive function of a preceding approximate covariance matrix associated with a preceding received block of the series.

17. The method as claimed in claim 11, wherein each received block comprises a respective digital representation of a plurality of samples of the received signal detected at the communication interface over a period of time.

18. The method as claimed in claim 11, wherein the received signal is representative of symbols, the method further comprising
- decoding estimates of the symbols represented by the $(j-D-1)^{th}$ filtered block; and
- calculating the error estimates associated with the $(j-D-1)^{th}$ filtered block using the decoded estimates of the symbols.

19. The method as claimed in claim 18, wherein the symbols include one or more predetermined symbols.

20. The method as claimed in claim 11, wherein the communication channel comprises an optical communication channel.

* * * * *